United States Patent
Stiesdal

(10) Patent No.: US 7,990,006 B2
(45) Date of Patent: Aug. 2, 2011

(54) GENERATOR AND WIND TURBINE

(75) Inventor: Henrik Stiesdal, Odense C (DK)

(73) Assignee: Siemens Aktiengesellschaft, Munich (DE)

( * ) Notice: Subject to any disclaimer, the term of this patent is extended or adjusted under 35 U.S.C. 154(b) by 299 days.

(21) Appl. No.: 12/384,317

(22) Filed: Apr. 2, 2009

(65) Prior Publication Data

US 2009/0256442 A1    Oct. 15, 2009

(30) Foreign Application Priority Data

Apr. 10, 2008   (EP) .................................. 08007142

(51) Int. Cl.
  *H02K 5/16* (2006.01)
  *H02K 5/20* (2006.01)
  *F03D 9/00* (2006.01)

(52) U.S. Cl. ............... 310/90; 290/44; 290/55; 310/54; 310/58; 310/64

(58) Field of Classification Search ............ 310/54, 310/58, 64, 156.31, 90; 384/100, 129, 276, 384/280; 290/44, 55
  See application file for complete search history.

(56) References Cited

U.S. PATENT DOCUMENTS

| 2006/0097582 A1 | 5/2006 | Engstrom |
| 2006/0152014 A1 | 7/2006 | Grant et al. |
| 2009/0256442 A1* | 10/2009 | Stiesdal ................ 310/90 |

FOREIGN PATENT DOCUMENTS

| EP | 1394406 A2 | 3/2004 |
| EP | 1657437 A1 * | 5/2006 |
| JP | 62189940 A | 8/1987 |
| WO | WO 01/21956 A1 | 3/2001 |
| WO | WO 2004/068678 A1 | 8/2004 |
| WO | WO 2008/039119 A1 | 4/2008 |

* cited by examiner

*Primary Examiner* — Quyen Leung
*Assistant Examiner* — David W. Scheuermann

(57) ABSTRACT

A generator for a wind turbine including a rotor arrangement and a stator arrangement is provided. The rotor arrangement includes a cylinder barrel or a sleeve enclosing a rotor element provided for the production of energy and having an outer cylinder barrel shaped surface in relation to a centre axis of the generator acting as a bearing surface of the rotor arrangement. The stator arrangement includes a cylinder barrel or a sleeve covering a stator element provided for the production of energy and having an inner cylinder barrel shaped surface in relation to the centre axis of the generator acting as a bearing surface of the stator arrangement. The bearing surfaces of the rotor arrangement and the stator arrangement are arranged oppositely to each other with a substantially cylinder barrel shaped air gap in-between, wherein the air gap comprises a lubricant. Also, a wind turbine including a generator is provided.

20 Claims, 3 Drawing Sheets

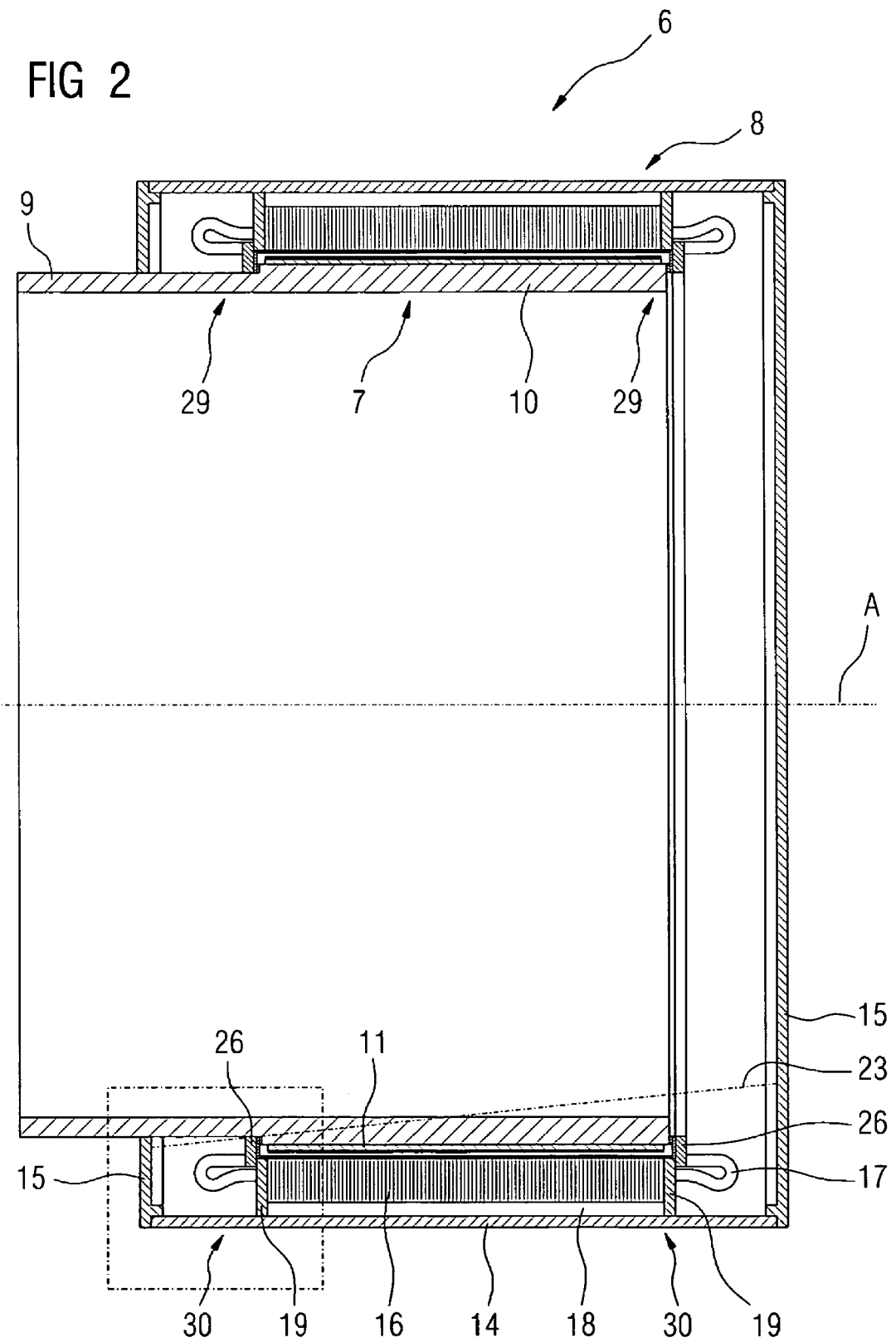

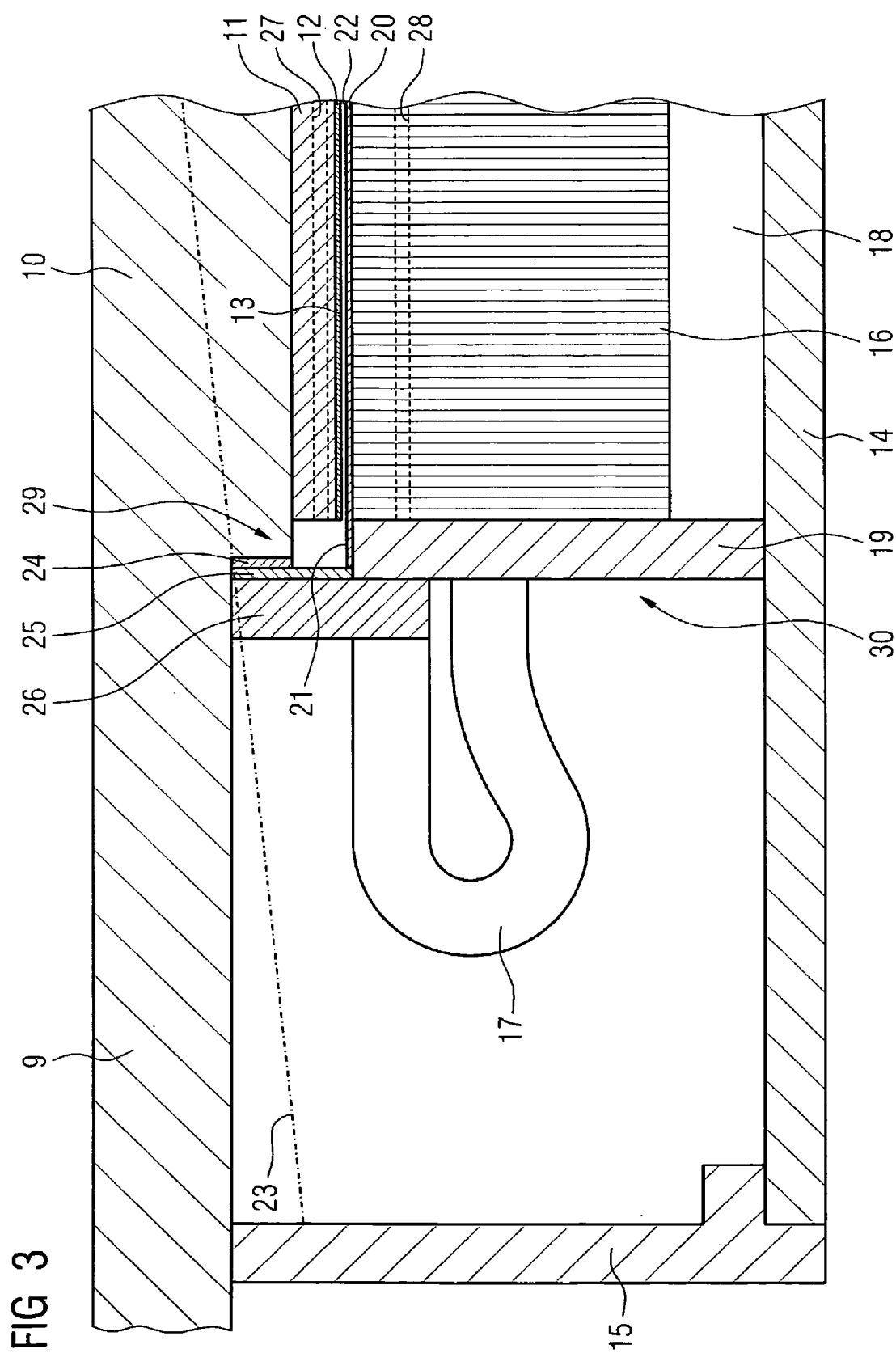

GENERATOR AND WIND TURBINE

CROSS REFERENCE TO RELATED APPLICATIONS

This application claims priority of European Patent Office application No. 08007142.6 EP filed Apr. 10, 2008, which is incorporated by reference herein in its entirety.

FIELD OF INVENTION

The invention relates to a generator for a wind turbine comprising a rotor arrangement and a stator arrangement. The invention concerns also a wind turbine comprising such a generator.

BACKGROUND OF INVENTION

In order to achieve a relatively high efficiency of a generator, in particular of a generator of a wind turbine, the air gap between the rotor elements, e.g. permanent magnets, and the stator elements, e.g. a laminate stack with windings, of the generator should be relatively small, generally in the range of only a few millimetres even for large generators like direct drive or directly driven generators.

To avoid mechanical damage to the rotor and stator elements it is thereby necessary to ensure that the outer surfaces of the rotor elements and the outer surfaces of the stator elements which are arranged oppositely to each other do not come into direct contact with each other during operation of the generator. Consequently the relatively small air gap required for efficiency reasons must be maintained at a nominal value within narrow tolerances.

In a modern wind turbine a direct drive generator can have a diameter of several meters. Maintaining the air gap in the range of a few millimetres between the rotor elements and the stator elements of a generator of such dimensions requires a comparatively rigid and therefore massive and heavy support structure, in particular of the stator arrangement. This in turn tends to increase the loads on the bearings of the generator and necessitates large, massive and expensive bearings.

Up to now there is a trade-off between the advantages of a small air gap between the rotor and stator elements and the disadvantages of a comparatively rigid and massive support structure. As a result, in particular direct drive generators for wind turbines often operate with larger air gaps between the rotor and stator elements as required for an optimum efficiency, to eliminate the risk of a mechanical damage due to a contact between the rotor and stator elements during operation of the generator.

Additionally large generators are often not so rigid that an air gap adjusted during manufacturing of the generator is maintained after transportation and installation of the generator. As a consequence large generators are often fitted with means for adjusting the air gap after transportation or installation. Such adjustment means increase the complexity of the generator and thus the costs of the generator.

In US 2006/0097582 A1 a generator is described, wherein the rotor of the generator is rotatably journalled to the stator of the generator via bearings arranged in or adjacent to the air gap between the rotor and the stator. This solution reduces the requirements for a rigid support structure in particular of the stator, but it requires large and expensive bearings. Furthermore this solution has a rather long tolerance chain determining the final dimension of the air gap and correspondingly determining the minimum air gap required to eliminate the risk of a mechanical damage due to a contact of the rotor and stator elements during operation of the generator.

SUMMARY OF INVENTION

It is therefore an object of the present invention to provide a generator and a wind turbine as initially mentioned in such a way, that the air gap between the rotor and stator elements of the generator is able to be maintained in a comparatively simple way.

This object is inventively achieved by a preferably direct drive generator for a wind turbine comprising a rotor arrangement and a stator arrangement. The rotor arrangement comprises a preferably thin-walled cylinder barrel or a preferably thin-walled sleeve enclosing rotor elements provided for the production of energy and having an outer cylinder barrel shaped surface in relation to a preferably horizontally aligned centre axis of the generator acting as a bearing surface of the rotor arrangement. The stator arrangement comprises a preferably thin-walled cylinder barrel or a preferably thin-walled sleeve covering stator elements provided for the production of energy and having an inner cylinder barrel shaped surface in relation to the preferably horizontally aligned centre axis of the generator acting as a bearing surface of the stator arrangement. The bearing surface of the rotor arrangement and the bearing surface of the stator arrangement are arranged oppositely to each other with a substantially cylinder barrel shaped air gap in-between, wherein the air gap comprises a lubricant.

Thus the inventor proposes to use the present air gap between the rotor and stator elements of a generator itself as bearing gap, wherein the rotor arrangement and the stator arrangement form a radial bearing or a kind of radial bearing. Thereby the rotor arrangement and the stator arrangement comprise respectively a cylinder barrel shaped bearing surface, wherein the remaining air gap between these bearing surfaces is at least partially filled with a lubricant to avoid a direct contact of the rotor arrangement and the stator arrangement, in particular of the bearing surfaces of the rotor arrangement and the stator arrangement. Thereby in particular the lower part of the generator is submerged into the lubricant. When the rotor arrangement rotates relatively to the stator arrangement its cylinder barrel shaped bearing surface comes into contact with the lubricant and substantially the entire cylinder barrel shaped bearing surface is able to become covered by a thin film of lubricant. As a consequence the rotor arrangement and the stator arrangement form, as already mentioned a kind of radial hydrodynamic bearing.

Because of the invention a direct drive generator is achievable with a comparatively small and well-defined air gap or bearing gap between the rotor and the stator arrangement without making structural parts of the generator very rigid and therefore very massive. The width of the air gap or bearing gap is comparatively simple to maintain with a high efficiency of the generator with respect to energy production. At the same time the need for external bearings between the rotor and stator arrangement is eliminated.

According to variants of the invention the rotor elements comprise permanent magnets and the stator element comprises a laminate stack of sheets with at least one winding. The permanent magnets are enclosed by the preferably thin-walled cylinder barrel or the preferably thin-walled sleeve of the rotor arrangement and the laminate stack is covered by the preferably thin-walled cylinder barrel or the preferably thin-walled sleeve of the stator arrangement.

According to another embodiment of the invention the preferably thin-walled cylinder barrel or the preferably thin-walled sleeve of the rotor arrangement comprises a non-magnetic metallic bearing material. Preferably the thin-walled cylinder barrel or the thin-walled sleeve of the rotor arrangement is a thin-walled polished stainless steel cylinder barrel or a thin-walled polished stainless steel sleeve. The stainless steel cylinder barrel or sleeve acts as both bearing element with bearing surface and corrosion protection for the permanent magnets that form the rotor side elements of the magnetic circuit of the generator.

According to another embodiment of the invention the preferably thin-walled cylinder barrel or the preferably thin-walled sleeve of the stator arrangement comprises nylon, polyamide or polytetrafluoroethylene (PTFE)/Teflon. Preferably the thin-walled cylinder barrel or the thin-walled sleeve of the stator arrangement comprises a plurality of thin sheets of nylon, polyamide or polytetrafluoroethylene (PTFE)/Teflon or a similar suitable non-magnetic bearing material. The outer surface of the thin-walled cylinder barrel or the thin-walled sleeve of the stator arrangement is fitted to the inner side of the laminate stack. The inner surface of the thin-walled cylinder barrel or the thin-walled sleeve of the stator arrangement forms the bearing surface which is oppositely arranged to the bearing surface of the rotor arrangement. The thin-walled cylinder barrel or sleeve acts thereby also as protection for the laminate stack.

As a rule the preferably thin-walled cylinder barrel or the preferably thin-walled sleeve of the rotor arrangement and/or of the stator arrangement is substantially concentric with the substantially horizontally aligned centre axis of the generator.

In a further development of the invention the rotor arrangement has a first and a second top-end and comprises on at least one top-end nearby the air gap an axially acting preferably thin bearing ring having a radial extension. Typically the thin bearing ring, e.g. made of stainless steel, is supported on the rotor arrangement to give the bearing ring stability. Preferably the stator arrangement has also a first and a second top-end and comprises on at least one top-end nearby the air gap an axially acting preferably thin bearing ring having a radial extension. The thin bearing ring of the stator arrangement, e.g. made of nylon, polyamide or polytetrafluoroethylene (PTFE)/Teflon, can be supported on a support ring of the stator arrangement to give the bearing ring stability. According to an embodiment of the invention a bearing ring of the rotor arrangement and a bearing ring of the stator arrangement are arranged oppositely to each other on each top-end. Thus the generator comprises additionally in relation to the substantially horizontally aligned centre axis of the generator axial acting bearing elements having axial bearing capacity.

According to another embodiment of the invention the preferably thin-walled cylinder barrel or the preferably thin-walled sleeve of the stator arrangement comprises a plurality of segments, e.g. made of polyamide, nylon or polytetrafluoroethylene (PTFE)/Teflon, forming the cylinder barrel or the sleeve. The benefit of this arrangement is that segments are comparatively simple to replace in the case of occurring wear in comparison to a replacement of complete cylinder barrel or a complete sleeve.

According to a further variant of the invention the stator arrangement comprises a plurality of ring-segments, wherein each ring-segment is fitted into the top-end of a slot for the stator winding. Thereby each segment can act as a wedge for the winding of the laminate stack.

According to a further embodiment of the invention the lubricant is acting as a cooling medium. Preferably the rotor arrangement and/or the stator arrangement comprise at least one axially extending conduit, wherein the lubricant is guided, e.g. actively pumped, through the at least one conduit of the rotor and/or the stator arrangement for cooling. Preferably the generator comprises for this purpose pumping means, e.g. in form of at least one pump, for pumping the lubricant through the at least one conduit of the rotor and/or the stator arrangement. As a rule the lubricant circulates in a closed circuit. Preferably the at least one conduit of the rotor and/or the stator arrangement and/or the pumping means are connected to at least one heat exchanger for cooling the lubricant.

The object of the present invention is also inventively achieved by a wind turbine comprising a generator as described before.

BRIEF DESCRIPTION OF THE DRAWINGS

The invention will in the following be explained in more detail with reference to the schematic drawings, wherein
FIG. 2 shows the generator of the wind turbine of FIG. 1
and
FIG. 3 shows a detail of the generator of FIG. 2.

DETAILED DESCRIPTION OF INVENTION

Figure 1:
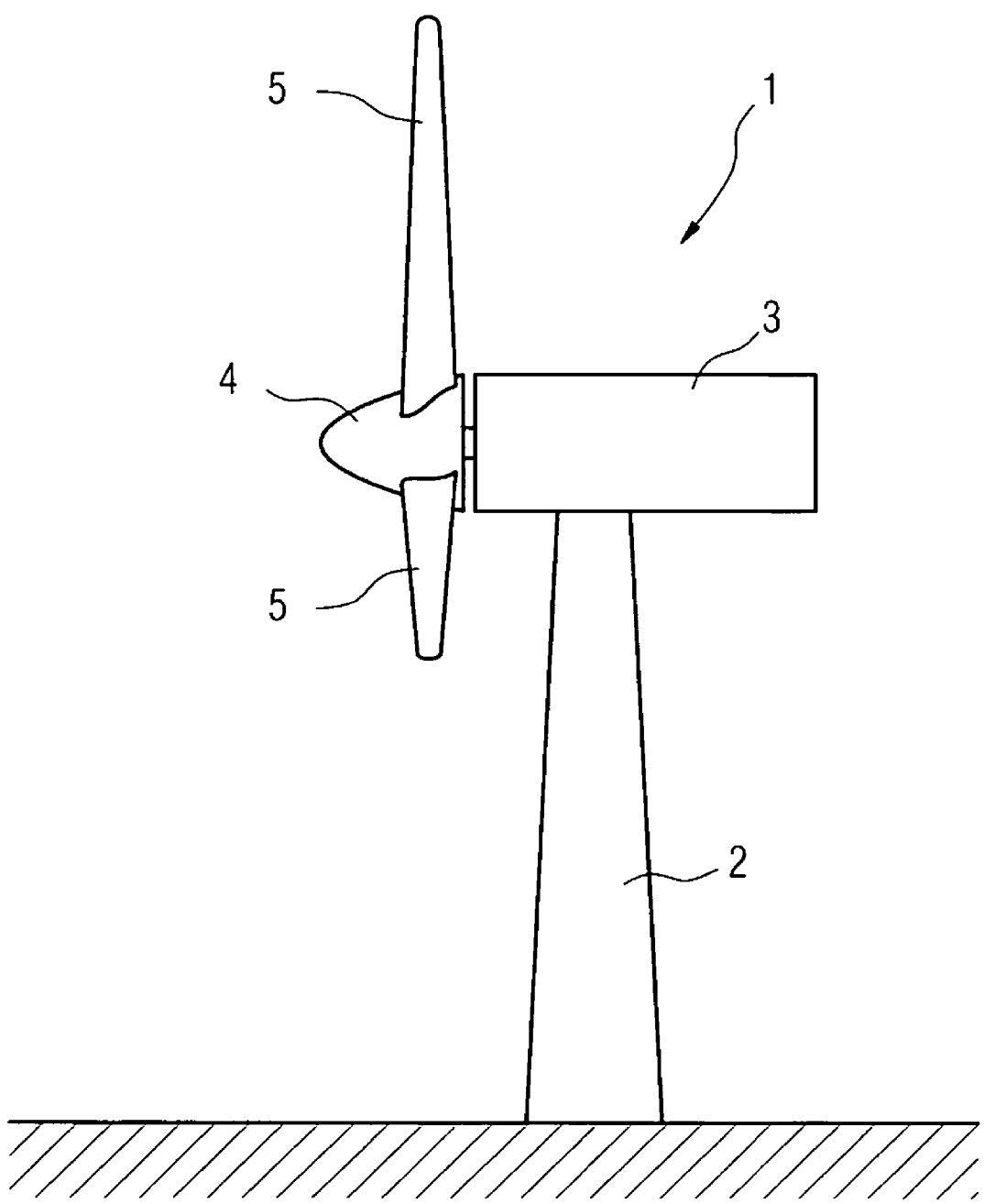
FIG. 1 shows a wind turbine.

FIG. 1 shows a wind turbine 1 comprising a tower 2, a nacelle 3 and a hub 4 with rotor blades 5. In the nacelle 3 several further components of the wind turbine 1 are arranged like a generator 6 as it is schematically shown in FIG. 2. The generator 6 is in a not shown manner connected to the hub 4 for the production of electrical energy and has a substantially horizontally aligned centre axis A.

The generator 6 of the present embodiment of the invention comprises a rotor arrangement 7 and a stator arrangement 8. The rotor arrangement 7 comprises in the case of the present embodiment of the invention a yoke 10 which is combined with a shaft 9. The shaft 9 is in a not shown manner connected to the hub 4 of the wind turbine 1. The yoke 10 comprises the rotor elements of the rotor arrangement 7 for the production of electrical energy in form of permanent magnets 11. In the case of the present embodiment of the invention the permanent magnets 11 are enclosed by a thin-walled sleeve 12. The width of the wall amounts preferably about 1-5 mm. The enclosure can also be achieved as a bandage or a thin-walled cylinder barrel. The thin-walled sleeve 12 is preferably a thin-walled polished stainless steel sleeve acting as both cylinder barrel shaped bearing element of the rotor arrangement 7 and as corrosion protection for the permanent magnets 11. The thin-walled sleeve 12 has a kind of shrink fit on the permanent magnets 11. The outer cylinder barrel shaped bearing surface 13 of the rotor arrangement 7 is preferably machined by grinding so as to perform a good bearing surface 13 which is substantially concentric with the centre axis A of the generator 6.

The stator arrangement 8 is supported by a stator body 14. The stator body 14 is kept substantially cylinder shaped and closed at both ends with end plates 15. The stator body 14 is in a not shown manner e.g. attached to a bedplate of the wind turbine 1.

The stator arrangement 8 comprises as stator element a laminate stack of sheets 16 with a stator winding 17. In the case of the present embodiment of the invention the laminate stack 16 is mounted in the stator body 14 with square bars 18 welded to the laminate stack 16 and with fingered compression rings 19 welded to both the square bars 18 and the stator body 14.

In the case of the present embodiment of the invention the laminate stack 16 and partially the inner surface of the compression rings 19 are covered by a thin-walled nylon cylinder barrel 20 which is substantially concentric with the centre axis A of the generator 6. The width of the nylon wall amounts preferably about 1-5 mm. The thin-walled nylon cylinder barrel can also be achieved as thin-walled nylon sleeve. Typically the thin-walled nylon cylinder barrel 20 comprises a plurality of thin sheets of nylon which form the cylinder barrel 20. As an alternative bearing material e.g. polyamide or polytetrafluoroethylene (PTFE)/Teflon can be used. The outer side of the thin-walled nylon cylinder barrel 20 is fitted to the inner surface of the laminate stack 16. The inner cylinder barrel shaped surface 21 of the thin-walled nylon cylinder barrel 20 forms the bearing surface of the stator arrangement 8 which is arranged oppositely to the bearing surface 13 of the rotor arrangement 7.

The remaining air gap 22 between the bearing surface 13 of the rotor arrangement 7 and the bearing surface 21 of the stator arrangement 8 which can also be constituted as bearing gap is at least partially filled with a not explicitly shown lubricant during stand-still of the generator 6 and is more or less completely filled with lubricant during operation of the generator 6. The generator 6 has thereby a reservoir of lubricant. Thus the rotor arrangement 7 and the stator arrangement 8 of the generator form a kind a hydrodynamic bearing. What would be in a conventional generator the air gap between the permanent magnets and the laminate stack, is in case of the present invention partly filled with a stationary bearing material on the stator side, partly filled with a rotating bearing material on the rotor side and at least partly filled with a lubricant. The lower part of this hydrodynamic bearing is immersed in lubricant. When applied to a wind turbine 1 as in the present case a respective generator of this type will have an inclined lubricant level 23.

Besides of the radial bearing components in form of the bearing surface 13 of the rotor arrangement 7 and the bearing surface 21 of the stator arrangement 8 the generator 6 comprises additionally axial bearing components.

On each top-end 29 of the rotor arrangement 7 and the yoke 10 respectively the rotor arrangement 7 is fitted with an axially acting thin bearing ring 24 having a radial extension and a width of about 1-5 mm. In case of the present embodiment of the invention the rings 24 are attached to the yoke 10. The rings 24 are e.g. made of stainless steel or any other suitable non-magnetic metallic bearing material.

In a comparable way the stator arrangement 8 comprises on both top-ends 30 an axially acting thin bearing ring 25 having a radial extension and also a width of about 1-5 mm. In case of the present embodiment of the invention the rings 25 are supported radially by the fingered rings 19 and axially by fingered support rings 26. Each support ring 26 is bolted to a fingered ring 19. The bearing rings 25 can e.g. be made of nylon, polyamide or polytetrafluoroethylene (PTFE)/Teflon.

As can be seen from FIG. 3 the bearing ring 24 and 25 are arranged oppositely to each other, form axially bearing components and add axial bearing capacity. Thereby lubricant can be in the space between the rings 24, 25.

As it becomes apparent the present invention allows a direct drive generator with a very small, well-defined and simple to maintain air gap between permanent magnets and a laminate stack without making structural parts of the generator very rigid or massive and without the need for external bearings. As a consequence such a generator has an improved efficiency in the production of electrical energy.

Thereby the technical bearing requirements of the air gap bearing of the generator are quite moderate. For example, a rotor arrangement for a 3.6 MW direct drive generator will typically have a mass of about 20.000 kg, an air gap diameter of about 4 m and a length of about 1.5 m, which leads to a bearing pressure of about 0.03 N/mm². In comparison typical normal bearing pressures of sliding bearings are in the range of 1-10 N/mm². Consequently a hydrodynamic lubricant film is easily established in the generator even at low rotational speeds and the bearing tolerances will be driven not by bearing functionality requirements but by the air gap requirements.

According to an embodiment of the invention the lubricant is additionally used as a cooling medium. As schematically illustrated in FIG. 3 both the rotor arrangement 7, in particular the permanent magnets 11, and the stator arrangement 8, in particular the laminate stack 16, can comprise at least one conduit 27, 28 with connection to the air gap 22 or bearing gap and/or the reservoir of the lubricant for guiding lubricant through the conduits 27, 28. In this way the permanent magnets 11 and the laminate stack 16 can be directly cooled. Typically the lubricant is actively pumped through the conduits 27, 28 by at least one not explicitly shown pump. The circuit of the lubricant can thereby comprise one or more heat exchanger for cooling the lubricant.

For a comparatively simple replacement, in particular of a part of the thin-walled nylon cylinder barrel 20, in the case of the occurrence of wear the cylinder barrel 20 can comprise a plurality of cylinder barrel segment shaped segments which segments form in their entirety the cylinder barrel 20. In this case not the whole cylinder barrel 20 must be replaced when wear occurs but only the affected segment. By the way also the sleeve 12 can comprise in a similar way a plurality of cylinder barrel segment shaped segments which form the sleeve 12.

According to a further embodiment of the invention the stator arrangement 8 can comprise a plurality of ring segments, wherein each ring segment is fitted into the top-end of a slot for the stator winding and acts as a wedge for the winding.

The invention claimed is:
1. A generator for a wind turbine comprising:
a rotor arrangement comprising:
   a rotor element,
   a first cylinder barrel or a first sleeve enclosing at least one rotor element, and
   a first bearing surface, and
a stator arrangement comprising:
   a stator element,
   a second cylinder barrel or a second sleeve covering a stator element, and
   a second bearing surface, and
an air gap in between the rotor arrangement and the stator arrangement; and
a lubricant,
wherein the rotor element is provided for the production of energy and has a first outer cylinder barrel shaped surface in relation to a center axis of the generator which acts as the first bearing surface of the rotor arrangement,
wherein the stator element is provided for the production of energy and has a second outer cylinder barrel shaped surface in relation to the center axis of the generator which acts as the second bearing surface of the stator arrangement,
wherein the first bearing surface and the second bearing surface are arranged oppositely from each other with the air gap in between which is formed substantially cylinder barrel shaped, and
wherein the air gap includes the lubricant.
2. The generator as claimed in claim 1, wherein the rotor element includes a permanent magnet.

3. The generator as claimed in claim 1, wherein the stator element includes a laminate stack with a winding.

4. The generator as claimed in claim 3, wherein the stator arrangement further comprises a plurality of ring-segments, wherein each ring-segment is fitted into the top-end of a slot for the winding.

5. The generator as claimed in claim 1, wherein the first cylinder barrel or the first sleeve comprises a non-magnetic metallic bearing material.

6. The generator as claimed in claim 5, wherein the first cylinder barrel or the first sleeve is a thin-walled polished stainless steel cylinder barrel or a thin-walled polished stainless steel sleeve.

7. The generator as claimed in claim 1, wherein the second cylinder barrel or the second sleeve comprises nylon, polyamide or polytetrafluoroethylene.

8. The generator as claimed in claim 7, wherein the second cylinder barrel or the second sleeve further comprises a plurality of thin sheets of nylon, polyamide or polytetrafluoroethylene.

9. The generator as claimed in claim 8, wherein the second cylinder barrel or the second sleeve further comprises a plurality of segments.

10. The generator as claimed in claim 1, wherein the first cylinder barrel or the first sleeve and/or the second cylinder barrel or the second sleeve is substantially concentric with the center axis of the generator.

11. The generator as claimed in claim 1, wherein the rotor arrangement further comprises, a first top-end and a second top-end and at least one of the top-ends which is nearby the air gap is fitted with an axially acting bearing ring having a radial extension.

12. The generator as claimed in claim 11, wherein the stator arrangement further comprises a first top-end and a second top-end at least one top-ends which is nearby the air gap is fitted with an axially acting bearing ring having a radial extension.

13. The generator as claimed in claim 12, wherein the bearing ring of the rotor arrangement and the bearing ring of the stator arrangement are arranged oppositely to each other.

14. The generator as claimed in claim 1, wherein the lubricant is used as a cooling medium.

15. The generator as claimed in claim 14, wherein the rotor arrangement and/or the stator arrangement further comprises a substantially axially extending conduit, wherein the lubricant is guided through the conduit.

16. The generator as claimed in claim 15, further comprising a pump to pump the lubricant through the conduit of the rotor and/or the stator arrangement.

17. The generator as claimed in claim 16, wherein the conduit of the rotor and/or the stator arrangement and/or the pump are connected to a heat exchanger to cool the lubricant.

18. A wind turbine comprising:
  a generator comprising:
    a rotor arrangement comprising:
      a rotor element,
      a first cylinder barrel or a first sleeve enclosing a rotor element, and
      a first bearing surface, and
    a stator arrangement comprising:
      a stator element,
      a second cylinder barrel or a second sleeve covering a stator element, and
      a second bearing surface, and
    an air gap in between the rotor arrangement and the stator arrangement; and
  a lubricant,
  wherein the rotor element is provided for the production of energy and has a first outer cylinder barrel shaped surface in relation to a center axis of the generator which acts as the first bearing surface of the rotor arrangement,
  wherein the stator element is provided for the production of energy and has a second outer cylinder barrel shaped surface in relation to a center axis of the generator which acts as the second bearing surface of the stator arrangement,
  wherein the first bearing surface and the second bearing surface are arranged oppositely from each other with the substantially cylinder barrel shaped air gap in between, and
  wherein the air gap includes a lubricant.

19. The wind turbine as claimed in claim 18, wherein the rotor element includes a permanent magnet.

20. The wind turbine as claimed in claim 19, wherein the stator element includes a laminate stack with a winding.

* * * * *